(12) United States Patent
Fujii et al.

(10) Patent No.: US 6,188,451 B1
(45) Date of Patent: Feb. 13, 2001

(54) OPTICAL ROTARY DEVICE AND MANUFACTURING METHOD THEREOF AND IMAGE DISPLAY DEVICE USING THEREOF

(75) Inventors: Akiyoshi Fujii; Hiroshi Hamada, both of Nara (JP)

(73) Assignee: Sharp Kabushiki Kaisha, Osaka (JP)

(*) Notice: Under 35 U.S.C. 154(b), the term of this patent shall be extended for 0 days.

(21) Appl. No.: 09/548,325

(22) Filed: Apr. 12, 2000

Related U.S. Application Data

(62) Division of application No. 08/887,203, filed on Jul. 2, 1997, now Pat. No. 6,072,566.

(30) Foreign Application Priority Data

Jul. 4, 1996 (JP) .................................................. 8-175270
Jun. 20, 1997 (JP) .................................................. 9-164682

(51) Int. Cl.$^7$ ............................. G02F 1/1335; G02F 1/03
(52) U.S. Cl. ........................... 349/15; 349/117; 430/20
(58) Field of Search ............................. 349/96, 117, 118, 349/15; 430/20, 315, 321; 359/494, 500, 900

(56) References Cited

U.S. PATENT DOCUMENTS

| | | | |
|---|---|---|---|
| 5,235,449 | * 8/1993 | Imazeki et al. | 349/96 |
| 5,327,285 | 7/1994 | Faris | 359/483 |
| 5,537,144 | 7/1996 | Faris | 348/58 |
| 5,636,043 | 6/1997 | Uemura et al. | 359/81 |
| 6,072,566 | * 6/2000 | Fujii et al. | 349/15 |

FOREIGN PATENT DOCUMENTS 58-184929A 10/1983 (JP).

OTHER PUBLICATIONS

Hasebe et al. Properties of Novel UV Curable Liquid Crystals and It's Retardation Film, Proc.. Int'l Display Research Conference, 1994, pp. 161–164.

* cited by examiner

Primary Examiner—William L. Sikes
Assistant Examiner—Duan Nguyen
(74) Attorney, Agent, or Firm—George W. Neuner, Esq.

(57) ABSTRACT

A photoresist is applied to a first substrate made of glass or resin which has been subjected to alignment treatment. Next, the photoresist is exposed and developed by UV light so as to form a non-optical rotatory region in a stripe manner after a mask having a desired pattern is provided on the photoresist. Then, polymerized liquid crystal is applied or dropped on the substrate complex thus prepared so far after an alignment layer on the substrate is rubbed. Further, a second substrate whose surface has been subjected to alignment treatment is placed on the substrate complex such that the directions of the alignment of the two substrates are orthogonal to each other, and the substrate thus positioned is pressed against the substrate complex. Finally, the substrate complex is irradiated by the UV light to cure the polymerized liquid crystal so as to form an optical rotatory region, thereby completing an optical rotatory device.

11 Claims, 13 Drawing Sheets

FIG.11 (a) PRIOR ART
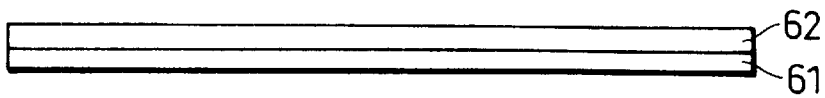
FIG.11 (b) PRIOR ART
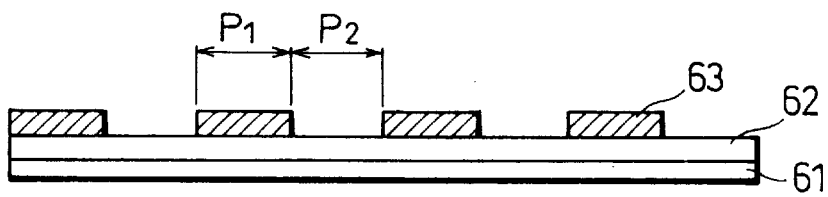
FIG.11 (c) PRIOR ART
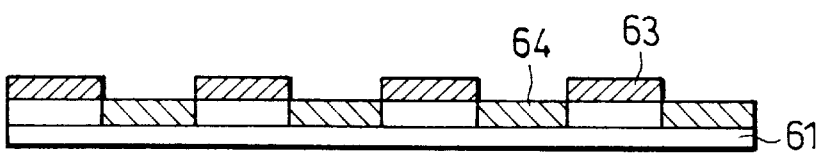
FIG.11 (d) PRIOR ART
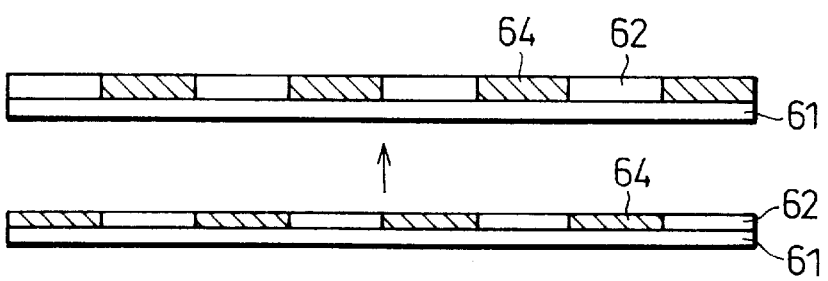

OPTICAL ROTARY DEVICE AND MANUFACTURING METHOD THEREOF AND IMAGE DISPLAY DEVICE USING THEREOF

This application is a divisional application of a U.S. patent application Ser. No. 08/887,203 filed Jul. 2, 1997 now U.S. Pat. No. 6,072,566.

FIELD OF THE INVENTION

The present invention relates to an optical rotatory device for use in a display device such as a CRT (Cathode Ray Tube) and a liquid crystal display panel (Liquid Crystal Display) adjusting a polarization direction of outgoing light from a pixel of the display device so as to realize a stereoscopic image, and also relates to a manufacturing method of the optical rotatory device and an image display device using thereof.

BACKGROUND OF THE INVENTION

Various stereoscopic image display devices for obtaining a stereoscopic image from a flat display has been proposed. For such a stereoscopic image display device which displays a stereoscopic image, the following three systems are widely adopted other than the hologram system.

According to the first system, a single image display device alternatively displays a right eye-use image and a left eye-use image in a time sharing manner. This system is arranged so that a stereoscopic image can be obtained based on the fact that an observer wears shutter spectacles whose right and left lenses open and close alternatively in synchronism with the alternating of the images.

According to the second system, a right eye-use image and a left eye-use image are alternatively displayed in a stripe manner by a single image display device. Then, a lenticular lens or slits, provided in a vicinity of the display device, assigns the displayed image to the right and left eyes respectively.

The third system is referred to as a polarizing spectacles system. This system is arranged so that planes of polarization of outgoing light from a right eye-use pixel and a left eye-use pixel are orthogonal, and image information of the right eye-use pixel and the left eye-use pixel are directed to the right and left eyes by polarizing plates provided to the spectacles worn by the observer to be perceived by the respective eyes. Note that, in this system, clockwise and anti-clockwise circularly polarized light may be used instead of the orthogonal planes of polarization.

The described three systems are based on a principle in which depth perception is organized by separately displaying parallax of right eye-use image and left eye-use image so as to be perceived by the respective eyes of the observer.

The following will describe respective characteristics of the three stereoscopic image systems.

According to the first system, a stereoscopic image displaying can be carried out by a single display device, thereby ensuring that the resolution of the display device can be prevented from lowering, and a stereoscopic image display region is not limited. Nevertheless, because the spectacles to be worn by the observer are heavy due to the shutter function, it is not suitable for use in a long period of time. Further, the spectacles with such function are expensive.

According to the second system, a stereoscopic image can be observed without wearing spectacles. However, the second system has a drawback in that the observer is required to fix his or her head since the stereoscopic image display region is limited.

According to the third system, it is required for the observer to wear spectacles with a specific function, yet the spectacles required in the third system are not as expensive and complex as that used in the first system, i.e., the spectacles of the third system are lighter and inexpensive. Further, a stereoscopic image can be observed by a plurality of observers with the respective spectacles, thereby having an advantage over the second system in that the stereoscopic image display region is not limited.

However, in the third system, in order to display images having different polarization directions, a system for combining images produced by two display devices or two projectors with a half mirror or a polarizing mirror is widely adopted. Consequently, the third system has a drawback in that the cost of the display device becomes high due to an increase in the number of constituting components, and therefore the third system is not suitable for home-use.

As a countermeasure, a polarizing plate (micro polarizing plate) composed of two types of polarizing plates which are arranged in a mosaic or a stripe manner on a single plane and their polarizing axes are orthogonal to each other has been invented. The polarizing plate of this type permits a single display device to display both the right eye-use image and the left eye-use image.

For example, Japanese Unexamined Patent publication No. 184929/1983 (Tokukaisho 58-184929) discloses a micro polarizing plate composed of two types of plane polarizing plates which are arranged in a mosaic manner so that the polarizing axes are orthogonal to each other. According to the above publication, the micro polarizing plate is provided in front of the display device, and an image is allowed to pass through spectacles having a pair of polarizing plates whose polarizing axes are orthogonal to each other. As a result, the right eye-use image and the left eye-use image are separated by the polarizing plates to be perceived by the respective eyes of the observer, thereby realizing a stereoscopic image.

Here, as the display device, a CRT (Cathode Ray Tube) or a liquid crystal panel (Liquid Crystal Display), etc. is adopted. In the case of adopting the CRT, the micro polarizing plate is provided in front of a display tube. In contrast, in the case of adopting the liquid crystal panel, since polarizing plates are already provided on the both sides of the liquid crystal panel, the polarizing plate on the side of the observer, or the polarizing plates on the side of the observer as well as on the side of a backlight are replaced with the micro polarizing plates.

FIG. 10 illustrates an arrangement of a stereoscopic image display device in which a liquid crystal panel is adopted as a display device, and two types of polarizing plates are arranged in a stripe manner in a horizontal row on both surfaces of the liquid crystal panel such that the polarizing axes of the two types of polarizing plates are orthogonal to each other for each row.

A stripe pitch of the two types of polarizing plates in a vertical column direction is substantially equal to a pixel pitch of a liquid crystal panel 51 in the vertical column direction. A left eye-use image information display region 52 and a right eye-use image information display region 53 are formed alternatively in the vertical column direction. With this arrangement, when viewed with polarizing spectacles 54, image information of the left eye-use image information display region 52 and the right eye-use image information display region 53 are separated by the polarizing spectacles 54 to be perceived by the respective eyes of the observer, thereby creating a stereoscopic image from the displayed image.

A method for manufacturing the micro polarizing plate, for example, is disclosed in U.S. Pat. No. 5,327,285 in detail. The following will describe the method for manufacturing the micro polarizing plate disclosed in the above U.S. Patent referring to FIG. 11(a) through FIG. 11(d).

Firstly, as shown in FIG. 11(a), a polarizing plate 62 is attached to a glass substrate 61. As the material of the polarizing plate 62, uniaxially extended PVA (polyvinyl alcohol) dyed with iodine is widely adopted; nonetheless, other materials may be substituted therefor. Secondly, as shown in FIG. 11(b), a photoresist 63 is applied in such a manner that the photoresist 63 is patterned on every other row, e.g., in a stripe manner, in the same interval as the pixel pitch. Here, for example, $P_1$ in FIG. 11(b) indicates the width of a pixel of the right eye-use image information, and $P_2$ in FIG. 11(b) indicates the width of a pixel of the left eye-use image information.

Thirdly, as shown in FIG. 11(c), the polarizing plate 62 is decolorized with potassium hydroxide (KOH) etc. by using the photoresist 63 as a mask to form a non-polarizing region 64. Instead, the polarizing region may be formed by (1) using an undyed substrate as the polarizing plate 62, next (2) the polarizing plate 62 is dyed with iodine through holes formed by patterning, then (3) the polarizing plate 62 is stabilized by boric acid.

Finally, the photoresist 63 is removed, and another substrate having the same arrangement is prepared. Then, as shown in FIG. 11(d), the two substrates thus prepared are positioned and combined together such that the directions of the polarizing axes of the polarizing plates 62 provided to each substrate are orthogonal to each other, thereby obtaining the micro polarizing plate.

Note that, beside decolarizing or dying the polarizing plate 62, a method for directly etching the polarizing plate 62 may be employed as well. In the case where the PVA is used as the polarizing plate 62, the polarizing plate 62 can be etched directly with water and ethanol. Further, in the case where resin other than PVA is used as the polarizing plate 62, the polarizing plate 62 can be etched directly by reactive ion etching and laser etching. The following will describe the steps for forming the micro polarizing plate by etching.

As shown in FIG. 12(a) and FIG. 12(b), the polarizing plate 62 is attached to the substrate 61, and the photoresist 63 is applied to the polarizing plate 62 for patterning, these steps being the same as those in the above-described method. Next, instead of decolorizing or dying the polarizing plate 62, as shown in FIG. 12(c), the polarizing plate 62, for example, is etched with water and ethanol by using the photoresist 63 as a mask. Then, the photoresist 63 is removed, and another substrate having the same arrangement is prepared. Then, as shown in FIG. 12(d), the two substrates thus prepared are positioned and combined together such that the directions of the polarizing axes of the polarizing plates 62 attached to each substrate are orthogonal to each other, thereby obtaining the micro polarizing plate.

Here, in FIG. 11(d) and FIG. 12(d), the micro polarizing plate is formed by combining the glass side of one substrate and the polarizing layer side of the other polarizing plate. Instead, for example, the micro polarizing plate may be formed by combining the substrates so that the surfaces on which each polarizing plate 62 is formed to face with each other, or so that the glass substrates 61 neighbor with each other.

Here, in the case of the stripe polarizing plate, the micro polarizing plate may be formed by directly dividing up the polarizing plate in a stripe manner, and thereafter combining two types of substrates with each other.

Further, instead of forming the polarizing plate 62 on the substrate 61, it may be possible that (1) a quarter wavelength plate is formed on the substrate (not shown), (2) a mosaic or a stripe retardation plate is prepared by the same method as above, and (3) the mosaic or stripe retardation plate thus prepared is positioned outside a polarizing plate, which has not been patterned, so that circularly polarized light rotating in the opposite direction are projected. In this case, a stereoscopic image can be obtained by observing with spectacles having circular polarizing plates.

The afore-mentioned U.S. Patent, as shown in FIG. 13, discloses an arrangement wherein a half wavelength plate 71 is provided on the side of an image display of either right eye-use or left eye-use. With this arrangement, the half wavelength plate 71 rotates the polarization direction of the light that has been transmitted through the polarizing plate 72 by 90°. Therefore, when viewed with polarizing spectacles (not shown), a stereoscopic image can be obtained.

Furthermore, the afore-mentioned U.S. Patent also discloses an arrangement wherein TN (Twisted Nematic) liquid crystal cell is provided outside the display device. Specifically, as shown in FIG. 14, TN liquid crystal 82 is sandwitched between two glass substrates 81, and a TN liquid crystal cell 84 having the same pixel pitch as that of a display device 83 is provided in front of the display screen of the display device 83. Here, the TN liquid crystal 82 is aligned in a twisted manner by 90°.

According to the above arrangement, the light that has been transmitted through the display device 83 enter the TN liquid crystal cell 84 through a polarizing plate 85. Here, for example, if a voltage is applied only to the region B of FIG. 14, the light passing through the region B leaves the TN liquid crystal cell 84 without optical rotation. On the other hand, the light passing through the region A leaves the TN liquid crystal cell 84 after being subjected to the optical rotation by 90° according to the alignment of the TN liquid crystal 82.

With the described arrangement, by providing the TN liquid crystal cell 84 so as to be in front of the display screen, the light from each pixel is subjected to optical rotation so as to correspond to image information of right eye-use or left eye-use. Namely, the TN liquid crystal cell 84 has the same function as the above-mentioned half wavelength plate 71 (see FIG. 13).

However, according to the method for manufacturing the micro polarizing plate disclosed in the above U.S. Patent, since the micro polarizing plate is prepared by combining the two different substrates so that the directions of the polarizing axes are orthogonal to each other, it is required to position the substrates with precision during combining thereof. FIG. 15(a) illustrates a case where the polarizing layer of one substrate and the glass side of the other substrate are not appropriately combined, causing a positioning error. FIG. 15(b) illustrates a case where the respective polarizing layers of the two substrates are not appropriately combined, causing a positioning error.

As indicated by the regions D in FIG. 15(a) and FIG. 15(b), in the case where the polarizing plates 62 are overlapped with each other due to inappropriate combining of the substrates, no light is allowed to transmit through the overlapped region since the polarizing axes of the polarizing plates 62 are orthogonal to each other in the overlapped region. Therefore, in the case of the stripe polarizing plate, a black line is generated in the same direction as the direction of the stripe.

On the other hand, as indicated by the regions C in FIG. 15(a) and FIG. 15(b), when a gap is created between the polarizing plates 62 due to a positioning error during combining of the substrates, the light passes through the gap. As a result, a white line (blank) is generated regardless of information to be displayed.

In short, the described arrangement has a drawback in that a black line and a blank etc. are generated in the case where a positioning error is generated due to the lowering of the accuracy of the combining of the substrates, thereby lowering the visibility.

Further, even in the case where the polarizing layer of one substrate and the glass side of the other substrate are combined with precision, since the glass substrate 61 exists between the two polarizing plates 62, if observed from certain directions, a black line and a blank etc. are still generated, thereby lowering the visibility as well.

Specifically, as shown in FIG. 16, since outgoing light 91 from the liquid crystal panel 51 perpendicular to the glass substrate 61 passes through the polarizing plates 62 corresponding to each pixel, no problem arises. On the other hand, light 92, for example, diagonally emitted from the liquid crystal panel 51 to the glass substrate 61 passes through two polarizing plates 62 whose polarizing axes are orthogonal to each other, such that the display in this direction always appears black. In contrast, light 93, for example, diagonally emitted from the liquid crystal panel 51 to the glass substrate 61 in the same manner as the light 92 passes through no polarizing plate 62, such that the display in this direction always appears white regardless of information to be displayed.

As described, the above arrangement has a drawback in that even if the two substrates are combined with precision, if observed from certain directions, there create (1) a region in which image information of the right eye-use and left eye-use is not displayed and (2) a region in which no image is displayed, thereby lowering the visibility.

Further, as shown in FIG. 13, in the case where the half wavelength plates 71 are attached in a slit manner, it becomes difficult to provide the half wavelength plates 71 in a stripe manner with precision. Namely, in cutting processing, it is difficult to cut the half wavelength plates 71 in a stripe manner so as to precisely correspond to the pixel pitch, and a long time is required for the processing. In contrast, in etching processing, the above-mentioned polarizing plate 62 (see to FIG. 11) can be etched in an order of tens of $\mu$m; however, in the half wavelength plate 71, the amount of etching is in an order of 100 $\mu$m to 200 $\mu$m, thereby making it difficult to carry out etching with high pitch accuracy in the direction of its thickness.

Furthermore, as shown in FIG. 14, in the arrangement where the TN liquid crystal cell 84 is provided in front of the display screen of the display device 83, transmitted light is selectively subjected to optical rotation by applying a voltage to pixels of right eye-use or left eye-use, thereby requiring an electric circuit for driving the TN liquid crystal cell 84; consequently, the device becomes thick and heavy, and the cost becomes high.

SUMMARY OF THE INVENTION

It is an object of the present invention to provide an optical rotatory device which does not cause a black line and a blank etc. regardless of observing directions, and a manufacturing method thereof, and it is another object of the present invention to provide an image display device for use with the optical rotatory device having high quality displaying and excellent visibility.

In order to achieve the above-mentioned objects, an optical rotatory device of the present invention which adjusts a plane of polarization of light from a pixel of a display device is characterized by including an optical rotatory region for rotating a plane of polarization of the light, a non-optical rotatory region for not rotating a plane of polarization of the light, and a substrate on which the optical rotatory region and the non-optical rotatory region are provided.

With this arrangement, outgoing light from the pixel of the display device passes through either the optical rotatory region or the non-optical rotatory region of the optical rotatory device. The plane of polarization of the light incident on the optical rotatory region is rotated therein, and the light having its plane of polarization rotated leaves the optical rotatory region so as to become light, for example, corresponding to right eye-use image information. In contrast, the plane of polarization of the light incident on the non-optical rotatory region is not rotated in the non-optical rotatory region, and therefore the light leaves the non-optical rotatory region with the same plane of polarization as before so as to become light corresponding to left eye-use image information, for example.

Here, because the optical rotatory region and the non-optical rotatory region are formed on the same single substrate, outgoing light from the pixel of the display device is bound to pass through either one of the two regions. With this arrangement, it is ensured that the light to be optically-rotated is done so in the optical rotatory region; on the other hand, the light not to be optically-rotated passes through the non-optical rotatory region without being rotary-polarized.

In a conventional arrangement, two substrates on which polarizing regions are formed are combined so that the polarizing axes thereof are orthogonal to each other; thus, when inappropriately combined, the problem of an overlapping polarizing region or a formation of a gap between the polarizing regions is caused. Consequently, at a region where the polarizing regions are overlapped, a black area is produced since the light is not transmitted therethrough, and at a portion where the gap is formed, a white display is produced regardless of image information.

Also, even in the case where the two substrates are combined with precision, since the substrate has a thickness, when the light from the pixel of the display device is emitted with a certain angle, a problem arises that the light passes through the polarizing region or the non-polarizing region twice, thereby generating a black area and a white area.

However, according to the described arrangement, since the optical rotatory region and the non-optical rotatory region are formed on the same single substrate, such a problem is not generated, and the light from the pixel of the display device passes through either the optical rotatory region or the non-optical rotatory region. Further, the same effect can be obtained even in the case where the incident light is diagonally emitted from the pixel.

For the described reason, this arrangement ensures that a black area and a white area, both having no image information, can be prevented regardless of the angle with which the display device is observed, thereby realizing high quality displaying.

Further, in a conventional arrangement wherein the TN liquid crystal cell is used, in order to achieve a selective optical rotation according to a pixel, an electric circuit etc. is required for applying a voltage to the pixel. However, such circuit is not required in the above-described arrangement. Therefore, as in the present embodiment, by using the optical rotatory device in the stereoscopic image display device, the size, the weight, and the cost of the device can be reduced.

In order to achieve the above-mentioned objects, the method for manufacturing the optical rotatory device of the present invention is characterized by including the steps of (1) forming a non-optical rotatory region for not rotating a plane of polarization of incident light by applying an isotropic transparent material to a first substrate, and by carrying out a desired patterning with respect to the isotropic transparent material, (2) dropping or applying a polymerized liquid crystal material to a first substrate so as to form an optical rotatory region for rotating a plane of polarization of incident light, and (3) polymerizing and curing the polymerized liquid crystal material while pressing a second substrate against the isotropic transparent material.

According to the described arrangement, an isotropic transparent material such as the photoresist and UV light sensitive resin etc. is applied to a first substrate made of glass or resin; then, a desired patterning is carried out with respect to the isotropic transparent material so as to form the non-optical rotatory region.

Then, the polymerized liquid crystal material is dropped or applied to the first substrate, and a second substrate is pressed against the first substrate with the polymerized liquid crystal sandwitched in between. Here, the polymerized liquid crystal flows into a region other than the non-optical rotatory region, and the polymerized liquid crystal being pressed by the second substrate is cured, thereby forming the optical rotatory region for rotating the plane of polarization of the incident light.

According to the arrangement, since the photolithography technique can be applied when forming the non-optical rotatory region, the non-optical rotatory region can be processed and formed in precise dimensions in conformity with the pixel pitch on the side of the display. As a consequence, an optical rotatory region also can be formed with precision in conformity with the pixel pitch on the side of the display, thereby realizing an optical rotatory device having high quality in conformity with the pixel dimensions on the side of the display.

Further, according to the above-arrangement, it is not required to combine two substrates having the polarization region as it has been required conventionally. Therefore, the optical rotatory device can be manufactured by a simpler method than the conventional method. Further, since the process for combining of two substrates is not required, the problem of positioning error during combining the substrates does not occur. Thus, in the case where an optical rotatory device manufactured by the described method are employed in a stereoscopic image display device, for example, a stereoscopic image display device having an excellent visibility in which no black line and blank occur can be realized.

In order to achieve the above-mentioned objects, the image display device of the present invention is characterized by including an optical rotatory device for adjusting a plane of polarization of light from a pixel of a display device, and the display device having pixels corresponding to the optical rotatory region and the non-optical rotatory region, the optical rotatory device including an optical rotatory region for rotating a plane of polarization of the light, a non-optical rotatory region for not rotating a plane of polarization of the light, and a substrate on which the optical rotatory region and the non-optical rotatory region are provided.

With this arrangement, since each pixel of the display device correspond to the optical rotatory region and the non-optical rotatory region of the optical rotatory device, it is ensured that the outgoing light from the each pixel is incident on the optical rotatory region or the non-optical rotatory region. Therefore, in the case of providing a the stereoscopic image display device in which an optical rotatory device is provided in a display device, a stereoscopic image display device having an excellent visibility and high quality displaying in which no black line and blank having no image information can be realized. Furthermore, unlike a conventional image display device, an electric circuit etc. for applying a voltage to the pixels is not required, thereby reducing the size, the weight, and the cost of the device.

For a fuller understanding of the nature and advantages of the invention, reference should be made to the ensuing detailed description taken in conjunction with the accompanying drawings.

BRIEF DESCRIPTION OF THE DRAWINGS

FIG. 11(a) through FIG. 11(d) are cross sectional views showing manufacturing steps of a conventional micro polarizing plate.

DESCRIPTION OF THE EMBODIMENTS

The following will explain one embodiment of the present embodiment referring to FIG. 1 through FIG. 9. First of all, an explanation of an optical rotatory plate and a retardation plate will be given, followed by a manufacturing method of an optical rotatory device 6 as an optical rotatory plate of the present invention.

Figure 6A:
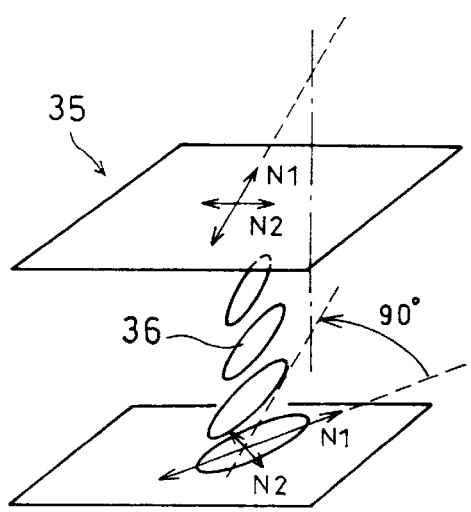
FIG. 6(a) is a perspective view showing an alignment of liquid crystal molecules between a pair of substrates.

An optical rotatory plate is an optical device having a characteristic for rotating the plane of polarization of incident plane-polarized light, and the characteristic is referred to as optical rotatory power. In the present embodiment, a photopolymerized liquid crystal material (will be described later) is subjected to alignment treatment and thereinafter, cured by UV light so as to obtain the optical rotatory plate. As shown in FIG. 6(a), the photopolymerized liquid crystal material has an arrangement in which the axes of liquid crystal molecules 36 are sequentially rotated along the direction of the thickness of the photopolymerized liquid crystal material so that the alignment directions of the liquid crystal molecules 36 differ by 90° with respect to the light incident surface and the light outgoing surface. With this arrangement, the plane-polarized light incident on the optical rotatory plate leaves the optical rotatory plate after the plane of polarization is rotated by 90°. Here, the liquid crystal molecules 36 have different index of refraction for the long axis and for the short axis.

Figure 6B:
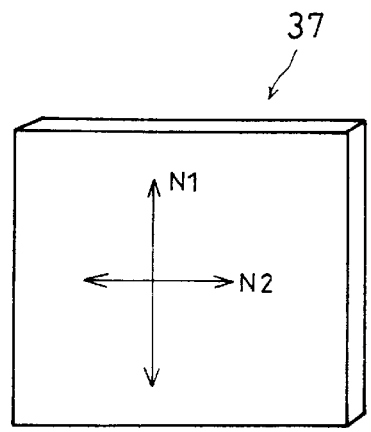
FIG. 6(b) is a prespective view showing optical axes of a half wavelength plate.
Figure 7:
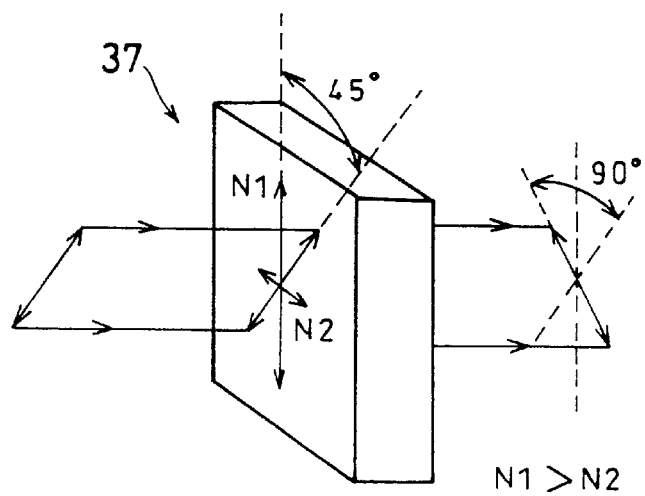
FIG. 7(a) is an explanatory view showing how light incident on a half wavelength plates is directed to after its plane of polarization is rotated by 90°.
FIG. 7(b) is an explanatory view showing how light incident on a half wavelength plates is directed to after its plane of polarization is rotated by 2θ.
Figure 7:
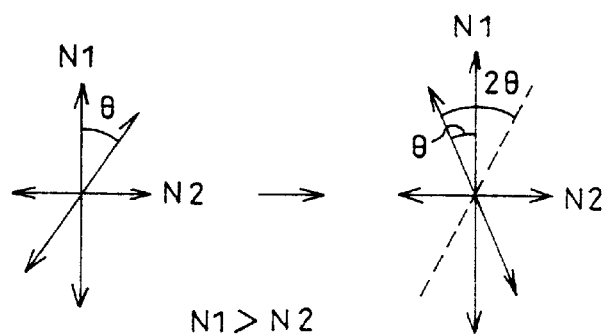

In contrast, a half wavelength plate 37 as a retardation plate is an optical device made of a material having uniaxial anisotropic index of refraction. As shown in FIG. 6(b), in general, the half wavelength plate 37 has optical axes N1 and N2 respectively along the direction of the molecules and in a direction perpendicular thereto, and the molecules inside the half wavelength plate 37 are distributed uniformly. The difference of the index of refraction between the optical axes N1 and N2 defines a high-speed axis and a low-speed axis. For example, as shown in FIG. 6(b), for N1>N2, the optical axis N1 is defined to be a low-speed axis.

Here, as shown in FIG. 7(a), if plane-polarized light is incident on the half wavelength plate 37 wherein the plane-polarized light has a plane of polarization which is inclined 45° with respect to the polarizing axis of the half wavelength plate 37, the outgoing light from the half wavelength plate 37 is plane-polarized light having a plane of polarization that is rotated by 90° with respect to the plane of polarization of the incident light. Therefore, the half wavelength plate 37 serves the same function as the optical rotatory plate 35 except the following points:

① In the half wavelength plate 37, molecules are distributed uniformly along the direction of the thickness. On the other hand, in the optical rotatory plate 35, the liquid crystal molecules 36 are aligned to be twisted such that the liquid crystal molecules 36 are not distributed uniformly along the direction of the thickness.

② In the half wavelength plate 37, as shown in FIG. 7(b), in order to rotate the plane of polarization of the incident plane-polarized light by 2θ (90° for example), it is required to incident plane-polarized light having its plane of polarization inclined by θ (45° for example) with respect to the polarizing axis N1 of the half wavelength plate 37. Namely, in order for the outgoing light to have a plane of polarization inclined by θ with respect to the polarizing axis N1 (polarizing axis N1 being a plane of symmetry), it is required to incident plane-polarized light on the half wavelength plate 37 with its plane of polarization being inclined by θ in the opposite direction with respect to the polarizing axis N1. As described, in the case of adopting the half wavelength plate 37, it is required to specify the angle that the plane of polarization makes with respect to the polarizing axis N1 of the half wavelength plate 37 when plane-polarized light is incident on the half wavelength plate 37.

In contrast, in the optical rotatory plate 35, the angle by which the photopolymerized liquid crystal material is twisted can be adjusted such that an appropriate angle can be selected. Further, since the plane of polarization can be rotated at a desired angle by adjusting the twisted angle of the optical polymerized liquid crystal material, the optical rotatory plate 35 can be adopted in a device other than the three-dimensional liquid crystal device.

③ The transmittance of plane-polarized light passing through the optical rotatory plate 35 or the half wavelength plate 37 is dependant on the wavelength of the incident light. However, in the optical rotatory plate 35, the wavelength dependency of the transmittance is smaller than that in the half wavelength plate 37. The following will explain the wavelength dependency of the transmittance of the optical rotatory plate 35 and the half wavelength plate 37 in detail.

In the case of sandwitching the half wavelength plate 37 between a pair of polarizing plates which are arranged in a Cross Nicol manner, the transmittance of the half wavelength plate can be expressed by the following equations:

$$I_R = \sin^2(\delta/2), \quad \delta = (2\pi \Delta n d)/\lambda$$

Here, $\Delta n$ denotes a difference between the refractive index of the long axis and short axis. That is to say, $\Delta n = n1 - n2$. Also, d denotes the thickness of the half wavelength plate 37.

Figure 8:
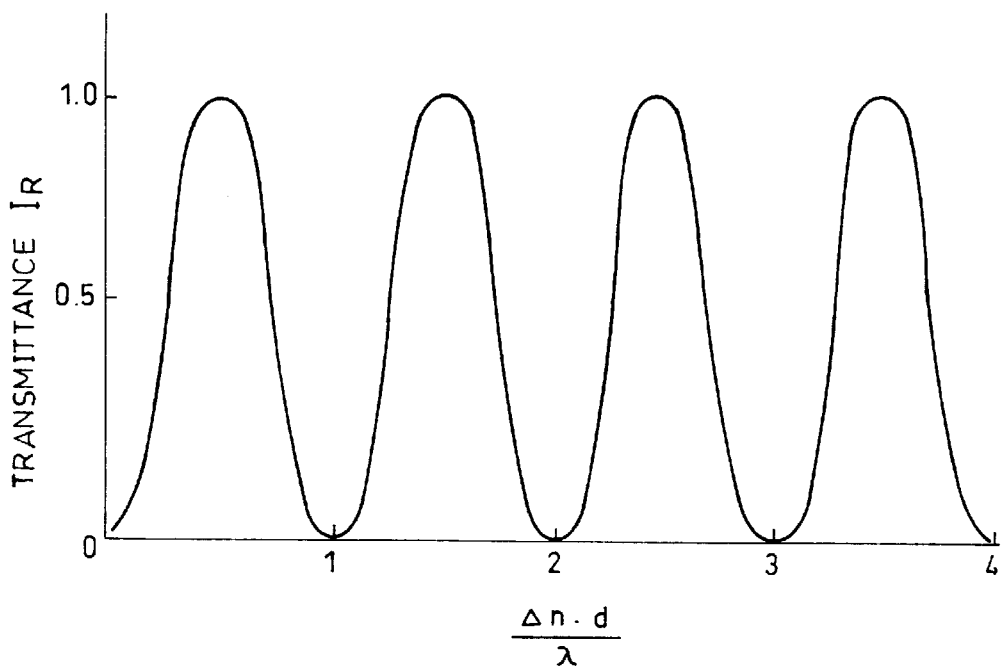
FIG. 8 is a graph showing the relationship between $\Delta nd/\lambda$ and transmittance $I_R$ in the half wavelength plate set between Cross Nicol state polarizers.

FIG. 8 shows a graph of the above equations where the horizontal axis denotes $\Delta n d/\lambda$ and the vertical axis denotes the transmittance $I_R$. Transmittance $I_R = 1$ indicates an instant where plane-polarized light after passing through the polarizing plate of light incident side is rotated by $\pi/2$ (2n+1), (n=0, 1, 2, . . . ) by the half wavelength plate 37, and thereafter leaves the polarizing plate of light outgoing side. Transmittance $I_R = 0$ indicates an instant where plane-polarized light after passing through the polarizing plate of light incident side is rotated by $\pi/2$, 2n, (n=0, 1, 2, . . . ) by the half wavelength plate 37, and the light is absorbed by the polarizing plate instead of leaving the polarizing plate of light outgoing side.

In contrast, in the case of sandwitching the optical rotatory plate 35 between a pair of polarizing plates which are arranged in a Cross Nicol manner, the transmittance $I_0$ can be expressed by the following equations:

$$I_0 = 1 - \frac{\sin^2\left[\pi/2(1+u^2)^{1/2}\right]}{1+u^2}, \quad u = \frac{2\Delta n d}{\lambda} \qquad (1)$$

Figure 9:
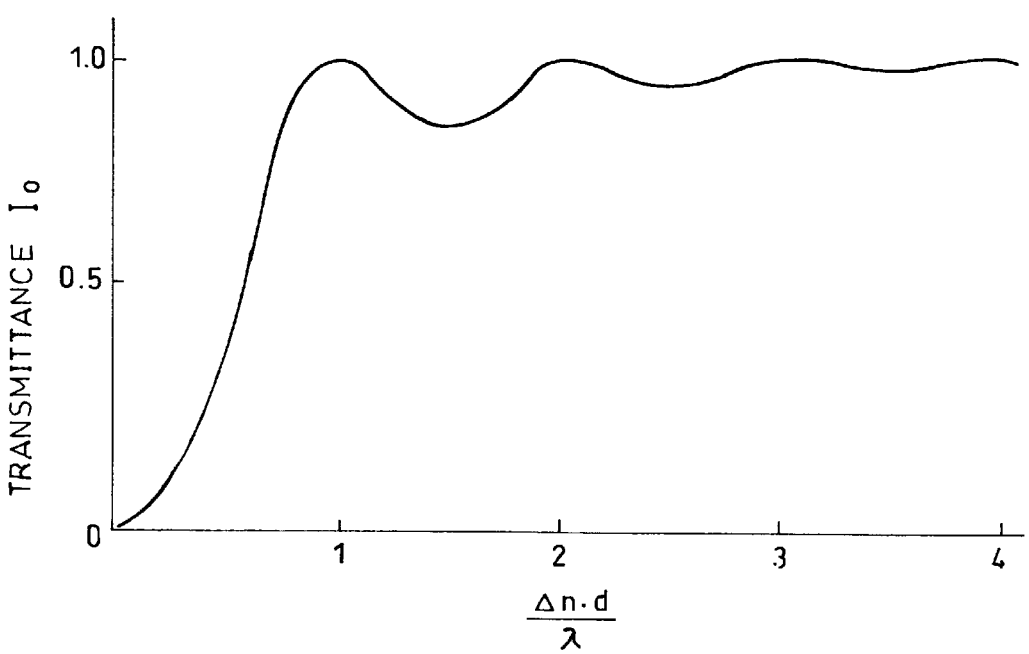
FIG. 9 is a graph showing the relationship between $\Delta nd/\lambda$ an transmittance $I_0$ in the optical rotatory device set between Cross Nicol state polarizers.
Figure 10:
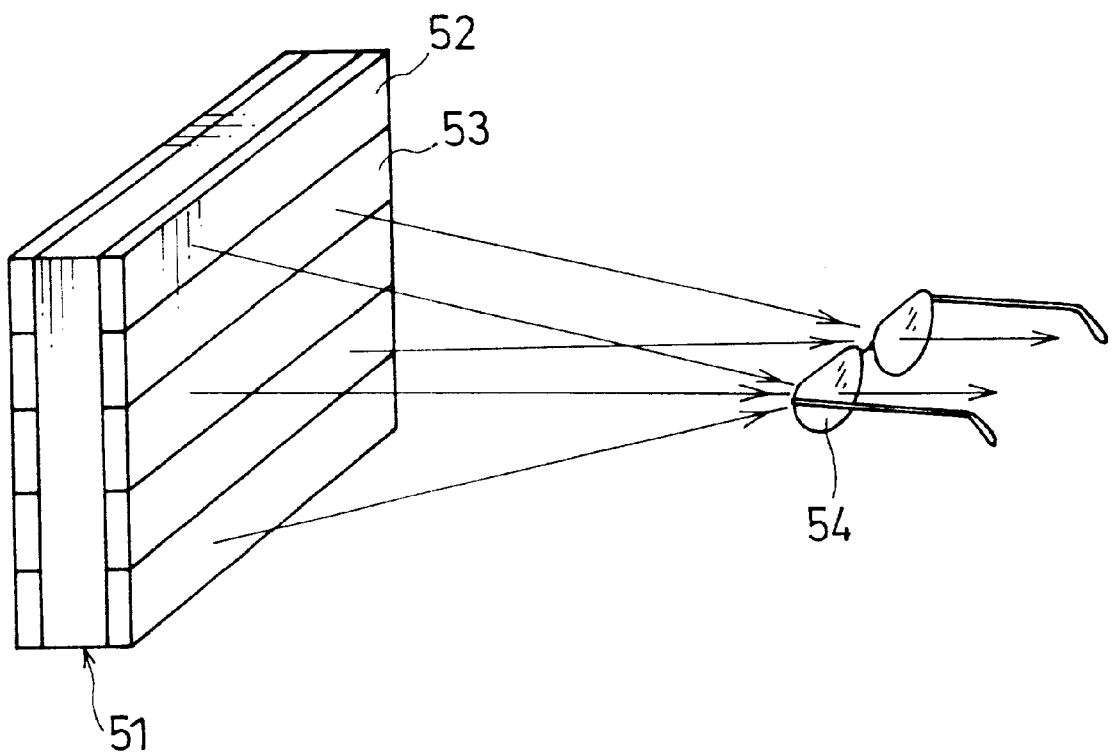
FIG. 10 is a perspective view of a conventional stereoscopic image display device.
Figure 12:
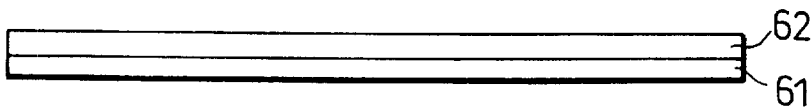
FIG. 12(a) through FIG. 12(d) are cross sectional views showing another manufacturing steps of a conventional micro polarizing plate.
Figure 12:
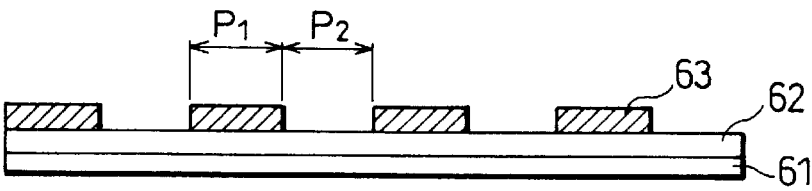
Figure 12:
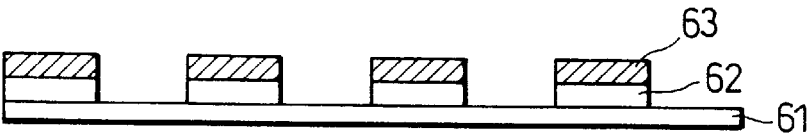
Figure 12:
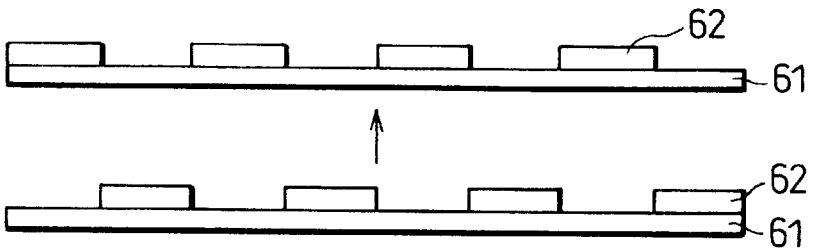
Figure 13:
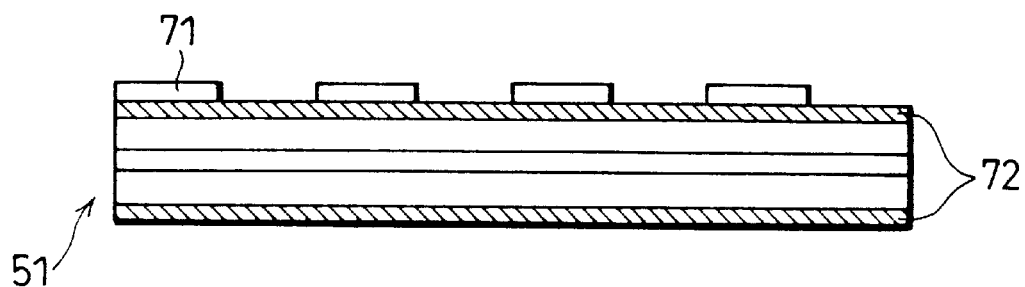
FIG. 13 is a cross sectional view showing a liquid crystal panel with a half wavelength plate.
Figure 14:
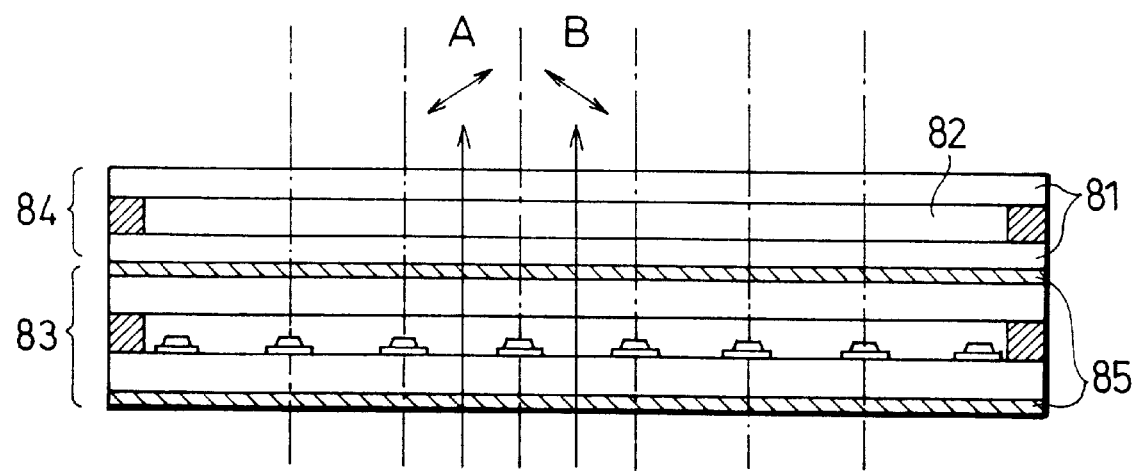
FIG. 14 is a cross sectional view showing a display device with a TN liquid crystal cell for the optical rotatory device.
Figure 15:
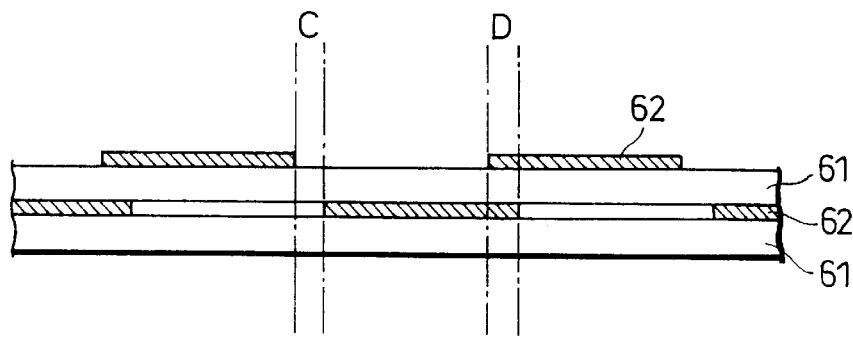
FIG. 15(a) and FIG. 15(b) are cross sectional views of a micro polarizing plate formed by combining two substrates.
Figure 15B:
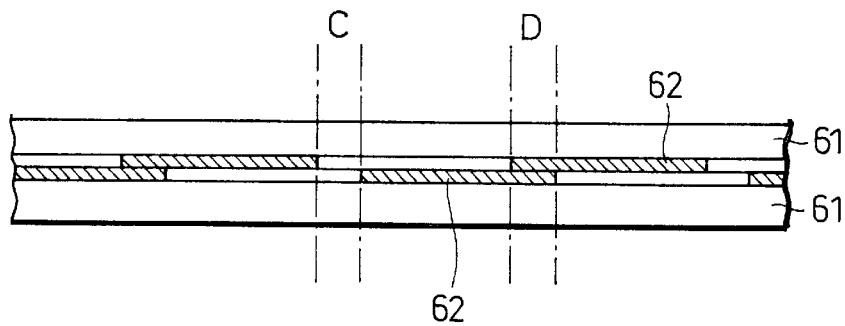
Figure 16:
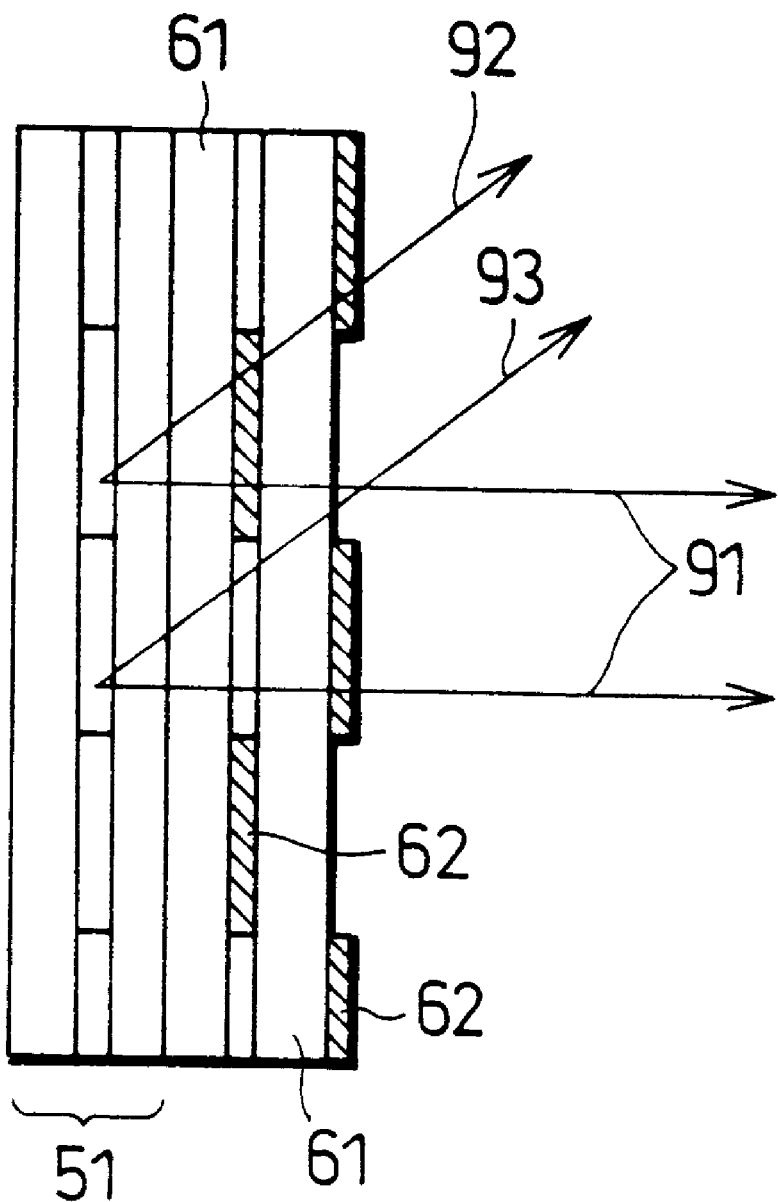
FIG. 16 is a cross sectional view showing a liquid crystal panel with a micro polarizing plate.

Here, $\Delta n$ denotes the difference of the index of refraction between the long axis and the short axis. That is to say, $\Delta n = n1 - n2$. Also, d denotes the thickness of the optical rotatory plate 35. FIG. 9 shows a graph of the equations where the horizontal axis denotes $\Delta n d/\lambda$ and the vertical axis denotes the transmittance $I_0$.

As shown in FIG. 8, the transmittance $I_R$ of the plane-polarized light passing through the half wavelength plate 37 oscillates between the transmittance and the absorbance in a range of $\Delta nd/\lambda$. In other words, the transmittance $I_R$ is always changing according to the wavelength of the incident light. For example, even if $\Delta nd$ is selected so as to make the transmittance $I_R$ of the green light ($\lambda=550$ nm) to have the value of "1", in the case where the blue light ($\lambda=420$ nm) or the red light ($\lambda=620$ nm) is incident on the half wavelength plate 37, the plane of polarization of the incident light is not rotated 90°, instead, elliptic polarized light is transmitted from the half wavelength plate 37. Here, components of the transmitted light are absorbed by the polarizing plate of light outgoing side. As described, since the transmittance $I_R$ changes according to the wavelength of the incident light, for example, in the case where the white light is incident on the half wavelength plate 37, colored light is transmitted from the half wavelength plate 37.

In contrast, as shown in FIG. 9, the transmittance $I_0$ of the plane-polarized light passing through the optical rotatory plate 35 oscillates where the value of $\Delta nd/\lambda$ is small, but converges to "1" as the value of $\Delta nd/\lambda$ increases. In other words, in the optical rotatory plate 35, as in the half wavelength plate 37, the transmittance $I_0$ is dependant on the wavelength $\lambda$ of the incident light; however, unlike the case of the half wavelength plate 37, the oscillation does not continue with respect to the entire range of $\Delta nd/\lambda$. Therefore, if the value of $\Delta nd/\lambda$ is increased by thickening the thickness d of the optical rotatory plate 35 for the wavelength $\lambda$ of the visible light, the wave length dependency of the transmittance $I_0$ can be reduced compared with that of the half wavelength plate 37. Therefore, in the case of adopting the optical rotatory plate 35, the phenomenon of colored outgoing light, which occurs when the white light is incident on the half wavelength plate 37, can be avoided by increasing the value of $\Delta nd$.

As described, the functions of the optical rotatory plate 35 and the half wavelength plate 37 differ in the described points ① through ③. The present invention makes a use of the advantage of the optical rotatory plate 35 described in ②.

The following explains a manufacturing method of an optical rotatory device 6 of the present invention referring to FIG. 1(a) through FIG. 1(e).

First, as shown in FIG. 1(a), a photoresist 2 (isotropic transparent material) is applied to a substrate 1 (first substrate) made of glass or resin which has been subjected to alignment treatment. Here, a solvent which does not damage the substrate 1 is selected for removing the photoresist 2 later. Additionally, in the present embodiment, the alignment treatment is carried out so that the substrate 1 is applied by polyimide, which is commonly adopted as an alignment layer so as to be baked.

In the case where resin is used as the substrate 1, it is preferable that the resin is made of a material which shows low birefringence such as PMMA (polymethyl methacrylate), PET (polyethylene terephthalate), and PES (polyether sulfone). Also, ARTON made by Japan Synthetic Rubber Co., Ltd., and PC (polycarbonate) etc. are preferable. Here, low birefringence indicates retardation $\Delta nd$ of not more than approximately 60 nm, yet retardation $\Delta nd$ of not more than 10 nm is preferable. As the photoresist 2, for example, the MFR series and V259PA etc. respectively made by Japan Synthetic Rubber Co., Ltd. and Nippon Steel Chemical Co., Ltd. may be used. The above-mentioned materials are one example of the present embodiment, such that materials to be used for the substrate 1 are not limited thereto.

Note that, in the case where the substrate 1 is made of a resin material, the problem arises that the substrate 1 cannot withstand the baking temperature of polyimide which is an alignment material. In this case, SiO or $SiO_2$ may be used instead as an alignment material, or the substrate 1 may be rubbed directly without using an alignment material. The above-mentioned materials are one example of the present embodiment, such that materials to be used for the alignment material are not limited thereto.

Secondly, as shown in FIG. 1(b), a mask (not shown) having a target pattern is applied to the photoresist 2. Then, the photoresist 2 is exposed to be developed by the UV light. Here, the photoresist 2 does not contain a component which shows optical rotation power. Hence, the photoresist 2 forms a non-optical rotatory region in which the plane of polarization of incident light is not rotated. In the present embodiment, the photoresist 2 is formed in a stripe manner.

Thirdly, the alignment layer on the substrate 1 is rubbed. Then, as shown in FIG. 1(c), polymerized liquid crystal 3 (polymerized liquid crystal material) containing an optically active component showing optical rotatory power is applied to or dropped on the substrate complex thus formed so far so as to form an optical rotatory region in which the plane of polarization of the incident light is rotated. This ensures that the light -incident on the optical rotatory region is subjected to optical rotation along the direction of the liquid crystal molecules.

Note that, as the polymerized liquid crystal 3, for example, materials introduced in Proc. International Display Research Conference, 1994, pp. 161 to 164 (H. Hasebe et al.) may be used.

The polymerized liquid crystal (UV light curable type) disclosed in the above-mentioned publication includes an acrylic group in the liquid crystal molecule, and has a Nematic layer at room temperature. Incidentally, in the publication, H. Hasebe et al. use the polymerized liquid crystal for the purpose of optically compensating STN (Super Twisted Nematic) liquid crystal panel, and also use the polymerized liquid crystal as a retardation layer for improving viewing angle.

The above-mentioned publication also introduces two methods for manufacturing a retardation plate. A brief explanation of the manufacturing methods is as follows. In one method, an alignment layer is provided on each one of two substrates. Between the substrates thus being subjected to alignment treatment, the above-noted polymerized liquid crystal is provided so as to be cured. Thereafter, one of the substrates is removed to obtain a desired retardation plate. In the other method, the alignment treatment is carried out by providing an electrode and an alignment layer on each of two substrates, and the polymerized liquid crystal is filled between the two substrates. Then, a voltage applied to the electrodes is adjusted. This results in that the retardation is controlled so as to correspond to R (red), G (green), and B (blue). Then, a retardation plate is obtained by curing the polymerized liquid crystal.

In the present embodiment, to the polymerized liquid crystal 3, 1 per cent of an n-type dichroism pigment (pigment material) by weight such as azo or anthraquinone pigment is added. The dichroism pigment is colored in black. The pigmented molecules has the following characteristics: (1) the pigmented molecules are aligned parallel to the direction of the liquid crystal molecule; (2) the pigmented molecules allow to pass through light having a plane of polarization parallel to the direction of the liquid crystal molecule; (3) the pigmented molecules absorb light having a plane of polarization perpendicular to the direction of the liquid crystal molecule.

Fourthly, as shown in FIG. 1(d), another substrate 4 (second substrate) whose surface has been subjected to the alignment treatment in accordance with the foregoing steps is placed on and pressed against the substrate complex prepared so far such that the alignment directions of the substrate 4 and the substrate complex are orthogonal. As a consequence, the polymerized liquid crystal 3 flows into a region other than the non-optical rotatory region between the substrates 1 and 4. Here, the alignment directions of the substrates 1 and 4 are orthogonal to each other, the polymerized liquid crystal 3 is aligned with a twisted angle of 90°. Next, the substrate complex is irradiated by the UV light 5 so as to polymerize and cure the polymerized liquid crystal 3, thereby forming the stripe optical rotatory region for rotating the plane of polarization of incident light by 90°. This completes the optical rotatory device 6.

In the present embodiment, the substrates 1 and 4 are subjected to the alignment treatment, and thereafter the optical rotatory region is formed. Instead, the following steps may be made. The photoresists 2 are exposed, then the alignment layer is provided with respect to the entire surface of the substrate 1 or regions on the substrate 1 where no photoresist 2 is provided, and thereafter the alignment layer is rubbed. Here, as the alignment layer, for example, SiO or SiO$_2$ may be used.

In the present embodiment, the optical rotatory region and the non-optical rotatory region are formed in a stripe manner. However, the present embodiment is not limited to this, provided that the optical rotatory region and the non-optical rotatory region are provided so as to have the same pattern as that of pixels from which light corresponding to the right eye-use image and the left eye-use image are emitted in the display device. More specifically, if the pixels are arranged in a checked pattern or in any other random patterns, the optical rotatory region and the non-polarization region are also arranged accordingly in such patterns. As a result, (1) the pattern of the pixels and the optical rotatory region and (2) the pattern of the pixels and the non-optical rotatory region are coincident with each other, thereby ensuring the optical rotation of light corresponding to the right eye-use image or the left eye-use image, and obtaining an image with high quality displaying.

Figure 1:
FIG. 1(a) through FIG. 1(e) are cross sectional views showing manufacturing steps of an optical rotatory device in accordance with the present invention.
Figure 1:
Figure 1:
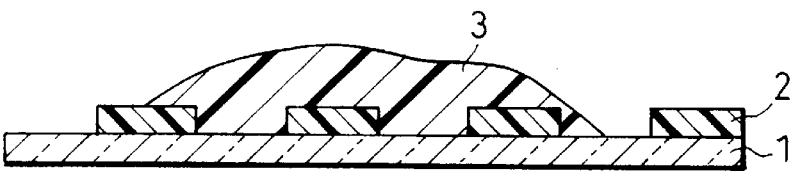
Figure 1:
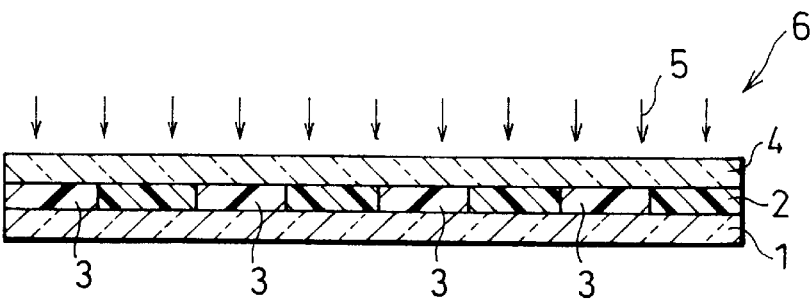
Figure 1:
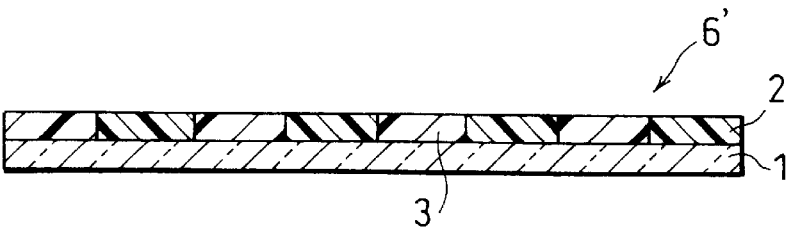
Figure 2:
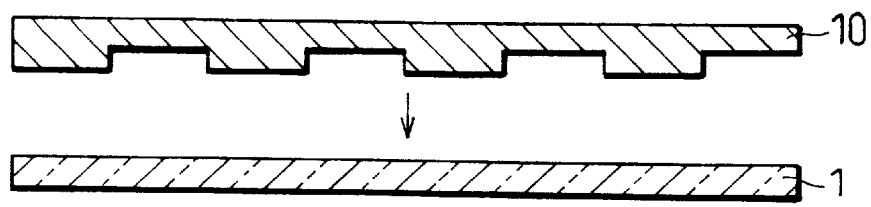
FIG. 2(a) through FIG. 2(c) are cross sectional views showing another manufacturing steps of non-optical rotatory region of the optical rotatory device.
Figure 2:
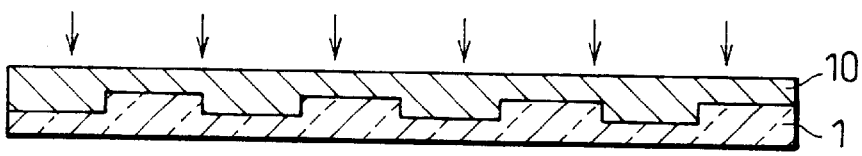
Figure 2:
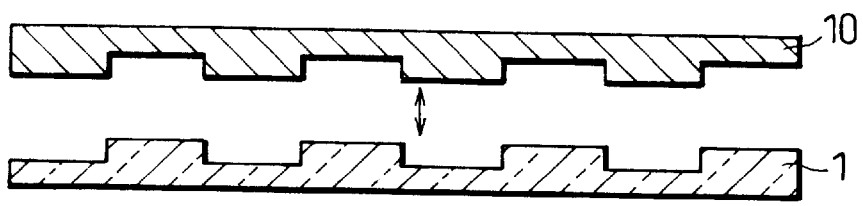

Additionally, as shown in FIG. 1(*e*), an optical rotatory device 6' which is thinner than the entire optical rotatory device 6 (see FIG. 1(*d*)) may be formed by removing the substrate 4.

In the case where the optical rotatory device 6' is provided in a display device so as to obtain a stereoscopic image display device, it is preferable to attach the surface of the optical rotatory device 6' from which the substrate 4 is removed (see to FIG. 1(*d*)); that is, the surface on which the optical rotatory region and the non-optical rotatory region are formed is attached to the display device. This is because, as has been described, if the display device and the optical rotatory region are separated by a distance, when diagonally observed, a neighboring pixel region falls in the view, i.e., cross talk occurs.

Here, in the case of adopting substrates 1 and 4 made of glass, since the thickness of the glass is in a range of 0.5 mm to 1.0 mm, it is likely that the viewable region will be limited for the described reason. Therefore, in this case, as shown in FIG. 1(*e*), it is preferable to form the optical rotatory device 6' by. removing the substrate 4.

Further, by adopting the substrates 1 and 4 made of glass, the substrates 1 and 4 and a glass substrate provided on the side of the display device have the same magnitude of thermal expansion when temperature changes. It is required that the pitch on the side of the display device and the pitch of the optical rotatory device correspond to each other with high precision. When using the same material for the both substrates in such a manner, the amount of bending and the occurrence of a pitch error can be reduced. The pitch error occurs due to a temperature change when the substrates are positioned and the bending occurs due to a temperature change when the substrates are in use. For this reason, in the case of using a display panel having a large size, it is preferable to adopt the substrates 1 and 4 made of glass.

In addition, although it is preferable that the thickness of the substrates 1 and 4 to be made as thin as possible, since the optical rotatory devices 6 and 6' are provided in front of the display device, it is practically difficult to obtain substrates 1 and 4 made of thin glass.

In contrast, in the case of adopting substrates 1 and 4 made of resin, the thickness thereof can be made as thin as 50 μm to 200 μm. Therefore, as shown in FIG. 1(*e*), the cross talk can be remarkably avoided without removing the substrate 4.

Further, by adopting substrates 1 and 4 made of resin, the thickness of the substrate can be made thinner compared with the case of adopting substrates 1 and 4 made of glass, thereby reducing the size and the weight of the optical rotatory devices 6 and 6'. Also, since the resin generally has elasticity, for example, the non-optical rotatory region can be formed with ease by embossing with respect to the substrate 1, thereby providing a non-optical rotatory region with ease. Accordingly, it is ensured to obtain a mass production of the optical rotatory devices 6 and 6' with ease. A method for manufacturing the optical rotatory devices 6 and 6' by embossing will be described later.

Since resin such as a plastic has a greater coefficient of thermal expansion and elasticity than that of glass, dimensional accuracy as high as that of glass cannot be obtained for resin. For this reason, mass production of the optical rotatory devices 6 and 6' whose substrates 1 and 4 are made of resin is suitable for the case where the dimensional accuracy is not required so much. For example, the case is preferable where the optical rotatory devices 6 and 6' are employed in a small display device having a large pitch size. Also, the mass production of the optical rotatory devices 6 and 6' made of resin is suitable where the size smaller than a glass panel is produced.

According to the arrangement, since the photolithography technique can be applied when forming the non-optical rotatory region, the non-optical rotatory region can be processed and formed in precise dimensions in conformity with the pixel pitch on the side of the display. As a consequence, an optical rotatory region also can be formed with precision in conformity with the pixel pitch on the side of the display, thereby realizing optical rotatory devices 6 and 6' having high quality in conformity with the pixel dimensions on the side of the display.

Further, according to the above-arrangement, it is not required to combine two substrates having the polarization region as it has been required conventionally. Therefore, the optical rotatory devices 6 and 6' can be manufactured by a simpler method than the conventional method. Further, since the process for combining of two substrates is not required, the problem of positioning error during combining the substrates does not occur. Thus, in the case where optical rotatory devices 6 and 6' manufactured by the described method are employed in a stereoscopic image display device, a stereoscopic image display device having an excellent visibility in which no black line and blank occur can be realized.

Further, according to the described arrangement, an optical rotatory device can be manufactured by simpler method than that employed in manufacturing a conventional micro polarizing plate and a micro retardation plate. Therefore, in the case of providing a the stereoscopic image display device in which an optical rotatory device manufactured by the described method is provided in a display device, it is possible to provide a stereoscopic image display device with a high quality displaying at a low cost.

If plane-polarized light enters the optical rotatory region, the plane of polarization thereof rotates along a direction of the molecule of the polymerized liquid crystal 3. However, in the process of the rotation, since the light has components in directions which are different from that of the plane of polarization, the outgoing light is not always plane-polarized light, but rather becomes elliptically polarized light which is synthesized by the components in the above-noted directions and the component of the plane-polarized light.

However, according to the described arrangement, the plane-polarized light having entered the optical rotatory region is subjected to optical rotation by the liquid crystal molecule, while the light perpendicular to the liquid crystal molecule, i.e., the light having the component causing the elliptically polarized light is absorbed by the n-type dichroism pigment. As a result, the outgoing light from the optical rotatory region is the only plane-polarized light. For this reason, the amount of the outgoing light is reduced as a component of the incident light entering the optical rotatory region is absorbed; nevertheless, the polarization state of the outgoing light is kept stable. As a result, the outgoing light from each of the right eye-use pixel and the left eye-use pixel can be separated desirably, thereby improving in visibility of stereoscopic image displaying.

Further, with the described arrangement, it is not required to soften the substrate by heating, thereby permitting the use of glass, which is relatively less expensive than resin, as the substrate 1 other than resin.

Further yet, with the described arrangement, because the plane of polarization of the light entering the optical rotatory region is rotated by 90° by the optical rotatory region, the directions of the planes of polarization of the light passing through the optical rotatory region and the non-optical rotatory region are orthogonal to each other. It ensures that the light entering the optical rotatory device can be separated into light corresponding to the right eye-use image and the left eye-use image.

Furthermore, with the described arrangement, since the polymerized liquid crystal 3 is light curable, by curing the polymerized liquid crystal 3 by irradiation, for example, of UV light, which is most widely adopted, the optical rotatory region corresponding to the pixel pitch can be formed with ease and precision.

Here, the polymerized liquid crystal 3 may have heat curability. In this case, a higher degree of polymerization can be achieved compared with the case where a light curable polymerized liquid crystal material is used as the optical rotatory region, thereby ensuring to obtain the optical rotatory region corresponding to the pixel pitch.

Moreover, with the described arrangement, since the substrates 1 and 4 are subjected to the alignment treatment, if the upper substrate 4 and the lower substrate 1 are provided such that the directions of the alignment treatment thereof do not correspond to each other, the direction of the molecules of the polymerized liquid crystal 3 sandwitched between the substrates 1 and 4 coincides with the direction of the alignment treatment at the portion contacting one of the substrates, and the direction of the molecules of the polymerized liquid crystal 3 is gradually rotated as closer to the other substrate. In other words, the polymerized liquid crystal 3 is aligned to be twisted between the substrates 1 and 4, thereby ensuring the optical rotation of the light incident on the polymerized liquid crystal 3.

Further still, in the present embodiment, since the substrates 1 and 4 are subjected to the alignment treatment so that the alignment directions are orthogonal to each other, the polymerized liquid crystal 3 sandwitched between the substrates 1 and 4 is aligned to be twisted by 90°. As a result, the plane of polarization of the light transmitting the polymerized liquid crystal 3 is rotated 90° in the polymerized liquid crystal 3, and the plane of polarization thus rotated and the plane of polarization of light not transmitting the polymerized liquid crystal 3 are orthogonal to each other, thereby ensuring the separation of the incident light into the light corresponding to the right eye-use image and the left eye-use image.

In addition, in the present embodiment, 1 per cent of an n-type dichroism pigment by weight is added to the polymerized liquid crystal 3; however, if the ratio of the pigment to the polymerized liquid crystal 3 to be added is in a range of 0.5 to 20 per cent by weight, an experiment showed that the same effect as the present embodiment could be obtained.

In the present embodiment, as shown in FIG. 1(b), the non-optical rotatory region is formed by exposing the photoresist 2 with the UV light. However, as shown in FIG. 2(a) through FIG. 2(c), the non-optical rotatory region also can be formed by molding the substrate 1 with the aid of a mold 10 which has been patterned so as to provide the non-optical rotatory region.

Specifically, as shown in FIG. 2(a), the substrate 1 made of resin such as a plastic or a film is heated to be softened. Next, as shown in FIG. 2(b), the mold 10 is pressed against the substrate 1. Then, as shown in FIG. 2(c), the mold 10 is removed from the substrate 1, thereby obtaining a substrate 1 having a pattern of the non-optical rotatory region.

Although not shown, the non-optical rotatory region also can be formed by using UV curable resin instead of directly molding the substrate 1 as described above. In this case, the method for forming the substrate 1 is almost identical to that shown in FIG. 2(a) through FIG. 2(c). Namely, the substrate to which the UV curable resin is applied is pressed against the mold having a pattern of the non-optically region. Then, after the UV curable resin is cured by irradiation of the UV light, the mold is removed.

Here, as the UV curable resin, for example, UV-2000 provided by Daikin Industries, Ltd. may be adopted; however, other UV curable resin may be used as well.

According to the described arrangement, the UV curable resin can be patterned with ease by pressing the mold having a pattern of the non-optical rotatory region thereagainst, thereby further simplifying the method for manufacturing an optical rotatory device. Further, since the patterning can be carried out without applying the photolithography technique etc., the cost required for -the manufacturing can be reduced.

Also, in the case of mass producing an optical rotatory layer composed of an optical rotatory region and a non-optical rotatory region by adopting the UV curable resin, the following method also may be employed.

Figure 3:
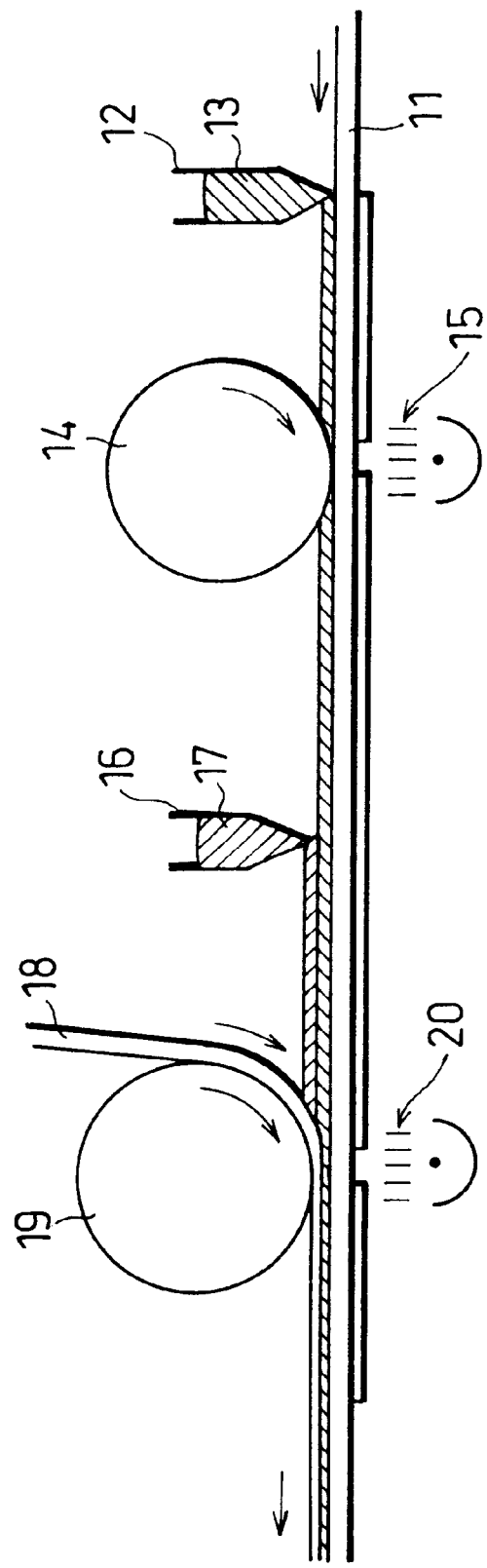
FIG. 3 is an explanatory view showing the optical rotatory device in mass production.

Firstly, as shown in FIG. 3, UV curable resin 13 is applied to a film 11 as a flexible substrate through a nozzle 12. Next, the UV curable resin 13 is spread over the film 11 by a roller (not shown), then a molding roller 14 having a pattern of the non-optical rotatory region is pressed against the UV curable resin 13 so as to mold it. At this time, the UV curable resin 13 is cured by the irradiation of the UV light 15 from below, thereby forming the non-optical rotatory region.

Secondly, an UV-curable liquid crystal 17 as the polymerized liquid crystal is applied to the substrate through a nozzle 16. Then, a roller 19 rotates so as to press a film 18 as a substrate. Here, the light cured resin 17 is cured with its molecular alignment being kept by the irradiation of UV light 20 from below as described above. Upon completing this step, either the film 11 or film 18 may be removed.

Figure 4:
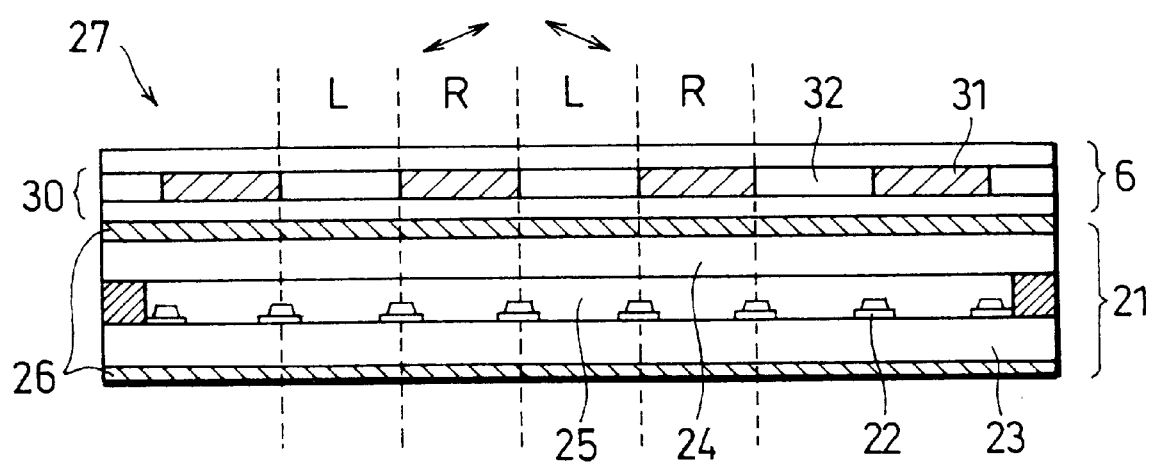
FIG. 4 is a cross sectional view showing an example of a structure of a stereoscopic image display device of the present invention.

FIG. 4 illustrates a cross sectional view of a stereoscopic image display device 27 in which the optical rotatory device 6 formed in the described manner is provided in front of the display screen of the display device 21.

The display device 21 is a liquid crystal display device in which liquid crystal 25 is filled between (1) a substrate 23 on which thin film transistors 22 are provided and (2) a substrate 24 provided so as to face the substrate 23. In the display device 21, polarizing plates 26 are provided respectively on the backlight side of the substrate 23 and on the side of the optical rotatory device 6 of the substrate 24.

An optical rotatory layer 30 of the optical rotatory device 6 is composed of the optical rotatory region 31 made of polymerized liquid crystal and a non-optical rotatory region 32 made of photoresist or UV curable resin. The pixel regions R and L of FIG. 4 respectively indicate pixel regions for supplying right eye-use image information and the left eye-use image information. In FIG. 4, the pixel region R and the pixel region L respectively correspond to the optical rotatory region 31 and the non-optical rotatory region 32; however, an arrangement where the pixel region R and the pixel region L respectively correspond to the non-optical rotatory region 32 and the optical rotatory region 31 is also allowed.

With the described arrangement, light emitted from the pixel region R transmits through the polarizing plate 26, and thereafter enters the optical rotatory region 31 where the polarization direction of the light is rotated by 90°. On the other hand, light emitted from the pixel region L transmits through the polarizing plate 26, and thereafter enters the non-optical rotatory region 32, and the light is transmitted with its polarization direction unchanged. Thus, the directions of polarization of the light emitted from the pixel regions R and L are orthogonal to each other as they pass through the optical rotatory layer 30. As a result, a stereoscopic image can be observed with the aid of spectacles having a pair of right and left polarizing plates (1) whose polarizing axes are orthogonal to each other and (2) which are provided to right and left lenses of the spectacles respectively.

As described, in the optical rotatory device 6 of the present embodiment, since the optical rotatory region 31 and the non-optical rotatory region 32 are patterned on the same single substrate, light emitted from the pixel of the display device 21 is bound to pass through either the optical rotatory region 31 or the non-optical rotatory region 32 with certainty. With this arrangement, the light to be subjected to optical rotation is optically-rotated by the optical rotatory region 31, while the light not to be subjected to optical rotation is not optically-rotated by the optical rotatory region 32.

In a conventional arrangement, two substrates on which polarizing regions are formed are combined so that the respective polarizing axes are orthogonal to each other. Thus, when inappropriately combined, the problem of an overlapping polarizing regions or a formation of a gap between the polarizing regions is caused. Consequently, at a portion where the polarizing regions are overlapped, a black area is produced on the display since the light is not transmitted therethrough, and at a portion where the gap is formed, a white area is produced regardless of image information.

Also, even in the case where the two substrates are combined with precision, since the substrate has a thickness, when the light from the pixel of the display device is emitted with a certain angle, a problem arises that the light passes through the polarizing region or the non-polarizing region twice, thereby generating a black area and a white area on the display.

However, according to the described arrangement, since the optical rotatory region 31 and the non-optical rotatory region 32 are formed on the same single substrate, such a problem is not generated, and the light from the pixel of the display device 21 passes through either the optical rotatory region 31 or the non-optical rotatory region 32 only once. Further, the same effect can be obtained even in the case where the incident light is diagonally emitted from the pixel.

For the described reason, this arrangement ensures that a black area and a white area, both having no image information, can be prevented regardless of the angle with which the display device 21 is observed, thereby realizing high quality displaying.

Further, in a conventional arrangement wherein the TN liquid crystal cell is used, in order to achieve a selective optical rotation according to a pixel, an electric circuit etc. is required for applying a voltage to the pixel. However, such circuit is not required in the above-described arrangement. Therefore, as in the present embodiment, when assembling the stereoscopic image display device 27 by using the optical rotatory device 6, the size, the weight, and the cost of the device can be reduced.

Although the stereoscopic image display device 27 has an arrangement wherein the optical rotatory device 6 is provided in front of the display screen of the display device 21, the same effect as in the present embodiment also can be obtained with the optical rotatory device 6' instead of the optical rotatory device 6.

Also, in the present embodiment, a liquid crystal display device is used as an example of the display device 21. However, a CRT, a PDP (Plasma Display Panel), a FED (Field Emission Display), a display adopting LED (Light-Emitting Diode), a display adopting inorganic or organic EL (electroluminescence); and other devices may be used as well. However, note that since all of the above-mentioned devices are of a self-emitting type, it is required that those devices are provided on the light incident side (side of the display) of the optical rotatory device 6 of the present invention.

Note that, in the optical rotatory device 6 of the present embodiment, the polymerized liquid crystal 3 is aligned so as to have a twisted angle of 90° between the substrates 1 and 4. However, the twisted angle of the polymerized liquid crystal 3 can be set to a desired angle according to the way by which the substrates 1 and 4 are aligned. This arrangement can be employed not only in the three dimensional image display device, but also other image display devices as well.

For example, if the twisted angle of the polymerized liquid crystal 3 is set to 45°, as illustrated in FIG. 4, light emitted from a pixel region R enters an optical rotatory region 31 after passing through the polarizing plate 26, and the light from the optical rotatory region 31 is light having a plane of polarization that is rotated by 45°. On the other hand, light emitted from a pixel region L enters the non-optical rotatory region 32 after passing through the polarizing plate 26, and the light from the non-optical rotatory region 32 is light having a plane of polarization that is not rotated. Therefore, the polarization directions of the light emitted from the pixel regions R and L make an angle of 45° with respect to each other upon passing through the optical rotatory layer 30.

Figure 5:
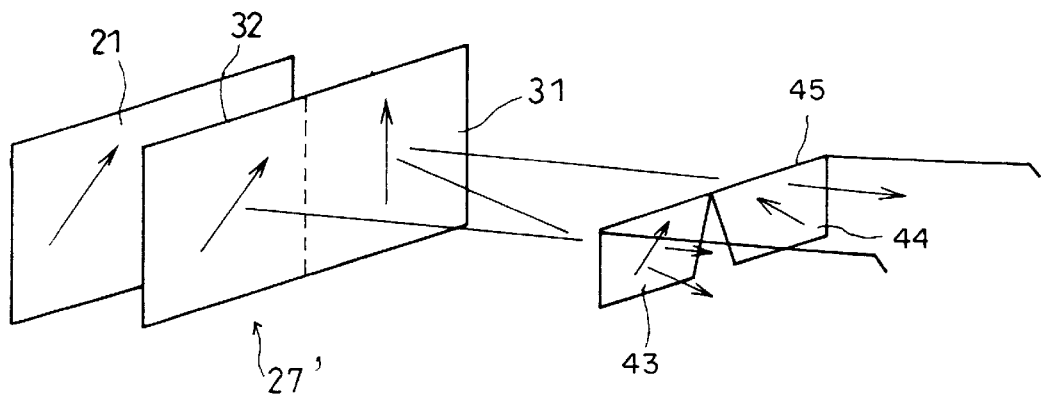
FIG. 5 is a perspective view showing how light passes through when viewing a display screen of an image display device with polarizing spectacles in accordance with another embodiment of the present invention.

As shown in FIG. 5, in the case where the optical rotatory device 6 and the display device 21 is provided in an image display device 27', when viewed with polarizing spectacles 45 having a pair of polarizing plates 43 and 44 whose polarizing axes are orthogonal to each other, an image of the optical rotatory region 31 can be observed with the both eyes. However, an image of the non-optical rotatory region 32 falls only on the left eye. The image is prevented from reaching the right eye because the polarization direction of the polarizing plate 34 which is provided to the right lens of the polarizing spectacles 35 is orthogonal to the polarization direction of the non-optical rotatory region 32. Hence, while the image of the optical rotatory region 31 can be observed always with the both eyes, the image of the non-optical rotatory region 32 is observed with only one eye temporarily.

Therefore, with the optical rotatory device 6, an impose screen for realizing simultaneous displaying can be achieved in which an image to be observed continuously and an image to be observed temporarily as required are displayed simultaneously. The impose screen is useful in watching a correspondence between two texts for example. Namely, on an impose screen, a text, for example, can be displayed on the optical rotatory region 31 continuously, while the translations (subtitles) corresponding to the text on the optical rotatory region 31 can be displayed on the non-optical rotatory region 32 as required. In this manner, their correspondence can be seen at a glance.

As described, the optical rotatory device of the present invention is characterized in that, preferably, the optical rotatory region is arranged so that a rotation angle of the plane of polarization of incident light is freely set.

With this arrangement, since the rotation angle of the plane of polarization of light entering the optical rotatory region can be set arbitrary, various image display devices can be composed by using the optical rotatory device and the display device in combination.

For example, if the rotation angle is set to 90°, the polarization directions of light having passed through the optical rotatory region and the non-optical rotatory region is orthogonal to each other so as to be completely separated. Therefore, if the respective light having passed through the optical rotatory region and the non-optical rotatory region are allowed to correspond, for example, to the right eye-use image and the left eye-use image, and when viewed with polarizing spectacles having a pair of polarizing plates whose polarizing axes corresponding to the respective polarized light are orthogonal to each other, a stereoscopic image can be observed. Therefore, by setting the rotation angle to 90°, a stereoscopic image display device can be obtained with ease.

In contrast, if the rotation angle is set to 45°, for example, when viewed with polarizing spectacles having a pair of polarizing plates whose polarizing axes are orthogonal to each other, an image of the optical rotatory region can be recognized with the both eyes, and an image of the non-optical rotatory region can be recognized with only one eye. In this case, the correspondence between the image of the optical rotatory region and the non-optical rotatory region can be seen at a glance.

The optical rotatory device of the present invention is characterized in that, preferably, the optical rotatory region rotates by 90° the plane of polarization of incident light.

According to this arrangement, since the plane of polarization of the light incident on the optical rotatory region is rotated by 90° by the optical rotatory region, the polarization directions of light passing through the optical rotatory region and the non-optical rotatory region are orthogonal to each other, thereby completely separating the light incident on the optical rotatory device into the light corresponding to the right eye-use image and the left eye-use image.

The optical rotatory device of the present invention is characterized in that, preferably, the optical rotatory region and the non-optical rotatory region are provided so as to have the same pattern as an arrangement pattern of pixels of the display device, the pixels emitting light corresponding to a right eye-use image and a left eye-use image.

According to this arrangement, even if the pixels of the display device producing the right eye-use image and the left eye-use image are arranged in a checked pattern, striped pattern or in any other random patterns, it is possible that the pattern of the pixels and the patterns of the optical rotatory region and the non-polarization region correspond to each other, thereby ensuring the optical rotation of the light corresponding to the right eye-use image or the left eye-use image, and obtaining an image with high quality displaying.

The optical rotatory device of the present invention is characterized in that, preferably, the optical rotatory region is made of a polymerized liquid crystal material including an optically active component which shows optical rotatory power.

According to this arrangement, since the optical rotatory region is made of a polymerized liquid crystal material including an optically active component which shows optical rotatory power, thereby ensuring the optical rotation of the light incident on the optical rotatory region along the direction of the liquid crystal molecules.

The optical rotatory device of the present invention is characterized in that, preferably, the polymerized liquid crystal material includes a pigmented material, the pigmented material transmitting light having a plane of polarization parallel to a direction of liquid crystal molecules, and the pigmented material absorbing light having a plane of polarization perpendicular to a direction of the liquid crystal molecules.

According to this arrangement, since the pigmented material allows the light having a plane of polarization parallel to a direction of liquid crystal molecules to transmit, and since the pigmented material absorbs light having a plane of polarization perpendicular to a direction of the liquid crystal molecules, the plane-polarized light having entered the optical rotatory region is subjected to optical rotation by the liquid crystal molecule, while the light perpendicular to the liquid crystal molecule, i.e., the light having the component causing the elliptically polarized light is absorbed by the pigmented material. As a result, the outgoing light from the optical rotatory region is the only plane-polarized light.

For this reason, the amount of the outgoing light is reduced as a component of the incident light entering the optical rotatory region is absorbed by the pigmented material; nevertheless, only the plane-polarized light whose polarization state is stable can be obtained as outgoing light. As a result, the light emitted from the pixels of the display device can be separated efficiently into the light corresponding the right eye-use image and the left eye-use image, thereby improving in visibility of stereoscopic image displaying.

The optical rotatory device of the present invention is characterized in that, preferably, the polymerized liquid crystal material is cured by light.

According to this arrangement, since the polymerized liquid crystal material is cured by light, by curing the polymerized liquid crystal material by irradiation, for example, of UV light as light for irradiating the polymerized liquid crystal material, which is most widely adopted, the optical rotatory region corresponding to the pixel pitch can be formed with ease and precision.

The optical rotatory device of the present invention is characterized in that, preferably, the polymerized liquid crystal material is cured by heat.

According to this arrangement, since the polymerized liquid crystal material is cured by heat, a higher degree of polymerization can be achieved compared with the case where a light curable polymerized liquid crystal material is used as the optical rotatory region, thereby ensuring to obtain the optical rotatory region corresponding to the pixel pitch.

The method for manufacturing the optical rotatory device of the present invention is characterized in that, preferably, the non-optical rotatory region is formed by applying the isotropic transparent material to the first substrate, and by pressing a mold having a pattern of the non-optical rotatory region against the isotropic transparent material.

According to this arrangement, the isotropic transparent material can be patterned with ease by pressing the mold having a pattern of the non-optical rotatory region thereagainst, thereby further simplifying the method for manufacturing an optical rotatory device. Further, since the patterning can be carried out without applying the photolithography technique etc., the cost required for the manufacturing can be reduced.

The method for manufacturing the optical rotatory device of the present invention is characterized in that, preferably, the first substrate and the second substrate are subjected to alignment treatment.

According to this arrangement, since the first and second substrates are subjected to the alignment treatment, the direction of the molecules of the polymerized liquid crystal material sandwitched between the substrates coincides with the direction of the alignment treatment at the portion contacting one of the substrates, and the direction of the molecules of the polymerized liquid crystal material is gradually rotated as closer to the other substrate. In other words, the polymerized liquid crystal material is aligned to be twisted between the substrates, thereby ensuring the optical rotation of the light incident on the polymerized liquid crystal material.

The method for manufacturing the optical rotatory device of the present invention is characterized in that, preferably, the first substrate and the second substrate are subjected to alignment treatment so that respective alignment directions are orthogonal to each other.

According to this arrangement, since the first and second substrates are subjected to the alignment treatment so that the alignment directions are orthogonal to each other, the polymerized liquid crystal material sandwitched between the substrates is aligned to be twisted by 90°. As a result, the plane of polarization of the light transmitting the polymerized liquid crystal material is rotated 90° in the polymerized liquid crystal material, and the plane of polarization thus rotated and light not transmitting the polymerized liquid crystal material are orthogonal to each other, thereby ensuring the separation of the incident light into the light corresponding to the right eye-use image and the left eye-use image.

The method for manufacturing the optical rotatory device of the present invention is characterized in that, preferably, the first substrate and the second substrate are made of glass.

According to this arrangement, by adopting first and second substrates made of glass, the first and second substrates and a glass substrate provided on the side of the display device have the same magnitude of thermal expansion when temperature changes. For this reason, it is required that the pitch on the side of the display device and the pitch of the optical rotatory device correspond to each other with high precision. When using the same material for the both substrates in such a manner, the amount of bending and the occurrence of a pitch error can be reduced. The pitch error occurs due to a temperature change when the substrates are in use and the bending occurs when the substrates are positioned. Thus, in this case, the non-optical rotatory region can be formed in conformity with the pixel pitch on the side of the display device with precision without being affected by the temperature change.

The method for manufacturing the optical rotatory device of the present invention is characterized in that, preferably, the first substrate and the second substrate are made of resin.

According to this arrangement, by adopting first and second substrates made of resin, the thickness of the substrate can be made thinner compared with the case of adopting first and second substrates made of glass, thereby reducing the size and the weight of the optical rotatory device. Also, since the resin generally has elasticity, for example, the non-optical rotatory region can be formed with ease by embossing with respect to the first substrate, thereby providing a non-optical rotatory region with ease. Accordingly, it is ensured to obtain a mass production of the optical rotatory device with ease.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A method for manufacturing an optical rotatory device, comprising the steps of:
    (1) forming a non-optical rotatory region for not rotating a plane of polarization of incident light by applying an isotropic transparent material to a first substrate, and by carrying out a desired patterning with respect to the isotropic transparent material;
    (2) dropping or applying a polymerized liquid crystal material to a first substrate so as to form an optical rotatory region for rotating a plane of polarization of incident light; and
    (3) polymerizing and curing the polymerized liquid crystal material while pressing a second substrate against the isotropic transparent material.

2. The method as set forth in claim 1, wherein, in said first step (1), the non-optical rotatory region is formed by applying the isotropic transparent material to the first substrate, and by pressing a mold having a pattern of the non-optical rotatory region against the isotropic transparent material.

3. The method as set forth in claim 1, further comprising the step of: (4) removing the second substrate after said step (3).

4. The method as set forth in claim 1, wherein the first substrate and the second substrate are subjected to alignment treatment.

5. The method as set forth in claim 1, wherein the first substrate and the second substrate are subjected to alignment treatment so that respective alignment directions are orthogonal to each other.

6. The method as set forth in claim 1, wherein the first substrate and the second substrate are made of glass.

7. The method as set forth in claim 1, wherein the first substrate and the second substrate are made of resin.

8. The method as set forth in claim 7, wherein the resin shows low birefringence.

9. The method as set forth in claim 7, wherein said resin is made of PMMA (polymethyl methacrylate).

10. The method as set forth in claim 7, wherein the resin is made of PET (polyethylene terephthalate).

11. The method as set forth in claim 7, wherein the resin is made of PC (polycarbonate).

* * * * *